March 27, 1934.  J. JONAS  1,953,015
DIRECT CURRENT VOLTAGE CONVERTER
Filed July 29, 1932  3 Sheets-Sheet 1

March 27, 1934.    J. JONAS    1,953,015
DIRECT CURRENT VOLTAGE CONVERTER
Filed July 29, 1932    3 Sheets-Sheet 2

Inventor
J. Jonas
by
Attorney

Patented Mar. 27, 1934

1,953,015

UNITED STATES PATENT OFFICE 1,953,015

DIRECT CURRENT VOLTAGE CONVERTER

Julius Jonas, Baden, Switzerland, assignor to Aktiengesellschaft Brown Boveri & Cie., Baden, Switzerland, a joint-stock company of Switzerland Application July 29, 1932, Serial No. 625,803
In Germany August 3, 1931

14 Claims. (Cl. 171—97)

This invention relates to improvements in electric direct current voltage converting systems and more particularly to systems in which direct current of one voltage is converted into alternating current and then reconverted into direct current of another voltage by means of electron discharge devices.

It is well known that direct current obtained from a supply line can be converted into direct current at the same or at another voltage in another supply line or in a distribution line by means of a system comprising a transformer associated with an electron discharge device of the gaseous or metallic vapor arcing type used as an electric current rectifier and with another electron discharge device of the same type provided with control electrodes and used as an electric current inverter. A system of such character transfers energy only in one direction, i. e., merely from one of the lines to the other line, but does not permit flow of energy from the second line to the first. Providing such system with additional controlling members or providing two systems symmetrically connected with respect to the supply lines, however, permits a manual or an automatic control of the flow of energy to be obtained.

It is, accordingly, one of the objects of the invention to provide a direct current voltage converting system using electron discharge devices in which system the direction of the flow of energy is reversible.

Another object of the invention is to provide a direct current voltage converting system using electron discharge devices in which system the direction of the flow of energy is automatically controlled in response to the relative conditions in the supply lines.

Another object of the invention is to provide a direct current voltage converting system using electron discharge devices in which system the flow of energy can be maintained at a desired intensity in either direction of flow.

Objects and advantages other than those above set forth will be apparent from the following description when read in connection with the accompanying drawings, in which:

Fig. 1 diagrammatically illustrates on embodiment of the invention in which the flow of energy is obtained in either direction by means of separate systems of electron discharge devices used respectively as electric current rectifiers and inverters.

Figure 1:
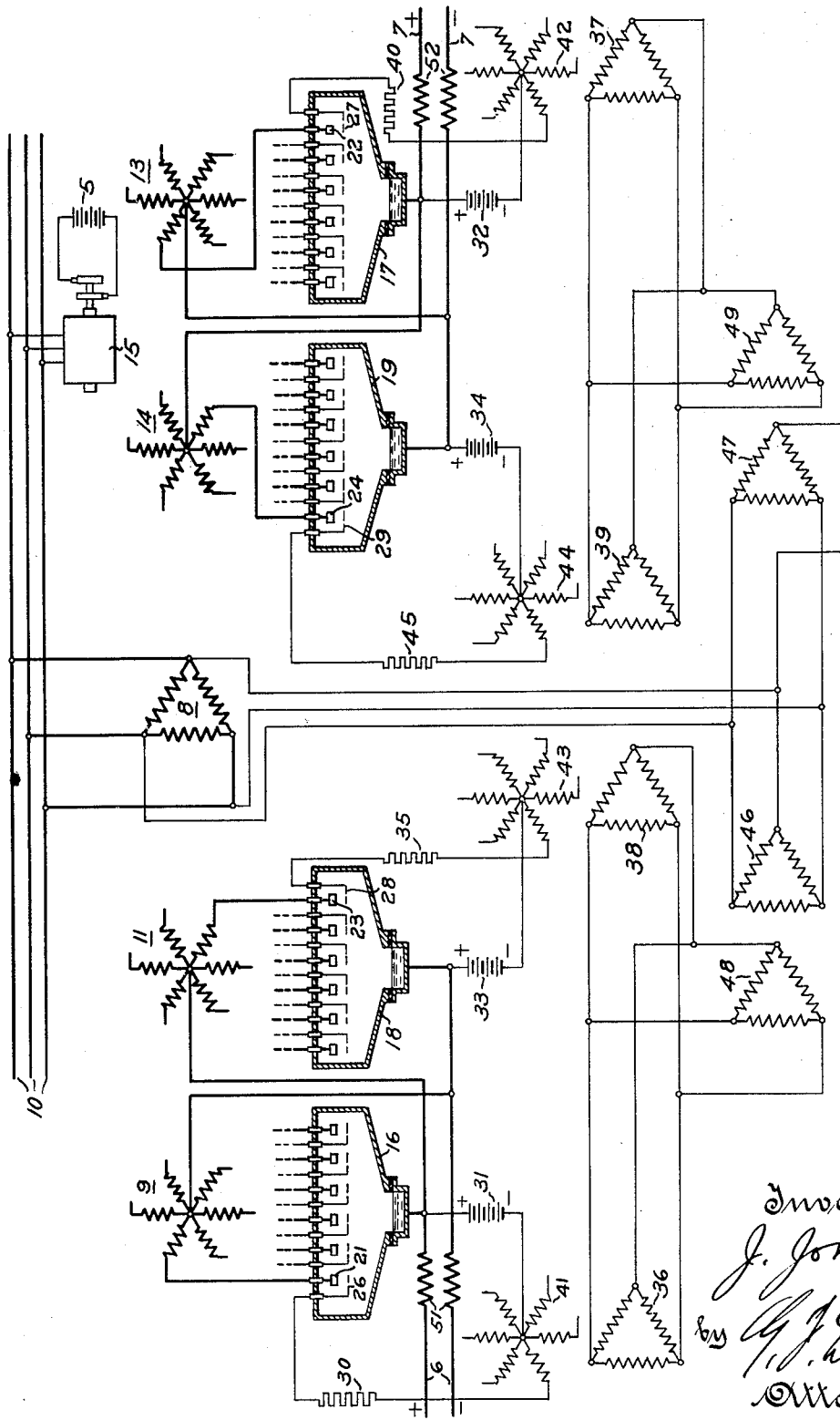

Referring specifically to the drawings by characters of reference, reference numerals 6, 7, designate two direct current lines between which a transfer of energy is to be effected. Each line is energized by a generator (not shown) supplying electrical energy thereto and each of the two lines may be supplied with current at any desired voltage independently of the voltage of the other line. Line 6 is connected with the neutral points of two windings 9, 11, of a polyphase transformer structure, such windings comprising any desired number of phases but being each provided with a neutral point and being wound to deliver identical terminal voltages. Winding 9 is connected with a set of anodes 21 of an electron discharge device 16 of the gaseous or metallic vapor arcing type having its cathode connected with the positive conductor of line 6 and used as a rectifier. Winding 11 is connected with a set of anodes 23 of a second electron discharge device 18 having its cathode connected with the negative conductor of line 6 and used as an inverter. Sets of anodes 21, 23, are each associated with sets of control electrodes 26, 28, respectively. Control electrodes 26 are connected through current limiting resistances 30 with the several phases of star connected secondary winding 41 of a control transformer having a primary winding 36. The neutral point of winding 41 is connected with the cathode of rectifier 16 by way of a direct current source such as battery 31. Control electrodes 28 are similarly connected with current limiting resistances 35, transformer 38, 43, and battery 33. Windings 9, 11, are connected in inductive relation with a winding 8 preferably connected in delta for the purpose of eliminating the presence of third harmonic voltages in windings 9 and 11. Winding 8 is connected with an alternating current line 10 which may be a supply line provided with a generator (not shown) or may be a control line associated with a synchronous motor 15 of the usual construction. Transformers 36, 41, and 38, 43, are supplied from the secondary winding 48 of a phase shifter having a primary winding 46 energized from line 10. The converting system also comprises members associated with line 7 and identical to the members described above, namely, transformer windings 13, 14, arranged in inductive relation with winding 8, rectifier 17, inverter 19, anodes 22, 24, control electrodes 27, 29, current limiting resistances 40, 45, control transformers 37, 42, and 39, 44, batteries 32, 34, and phase shifter 47, 49; all of the above being connected in a manner similar to that above described. The ripples which may be introduced by the system into the current drawn from one of the lines and into the current supplied to the other line are reduced by the presence of suitable means such as reactances 51, 52, inserted in the two lines.

A duplicate voltage converting system is thus obtained, the one portion consisting of inverter 18, transformer windings 11, 8, and 13, and rectifier 17, with the associated control members; the other portion consisting of inverter 19, transformer windings 14, 8 and 9, and rectifier 16, with the associated control members. It will be seen from the drawings that winding 9 and rectifier 16 are connected between the conductors of line 6, winding 11 and inverter 18 being connected with the same lines but in such manner as to be at opposite polarity. The two transformer windings, the rectifier and the inverter are thus connected in series short circuit and a short circuit current will flow in such circuit unless the particular anode 21 and the particular anode 23, operable at any instant considered, are supplied from windings 9 and 11 with voltages equal in magnitude and opposite in direction. To obtain such result the transformers 36, 41 and 38, 43, are so arranged that each anode 21 is made operable due to the action of the control electrodes 26 during periods of time when one of control electrodes 28 permits operation of the anode 23 which receives a voltage displaced 180 electrical degrees with respect to the voltage applied to the anode 21 then in operation. Although rectifier 16 and inverter 18 do not carry current simultaneously they are thus simultaneously operable to carry such current in response to conditions in the system. Anodes 22 of rectifier 17 and anodes 24 of inverter 19 are controlled in a manner similar to that above described. The control of all anodes has been assumed as being obtained from batteries maintaining the control electrodes at a negative potential with respect to the associated cathodes, each electrode being brought to a positive potential with respect to such cathode by the associated control transformer winding at such time when it is desired to make the associated anode operable. It will be understood, however, that any other control means such as mechanical distributors or spark gaps may be used for energizing the control electrodes.

In operation, assuming that energy is to be transferred from line 6 to line 7, such transfer is possible only after line 10 is energized at a voltage of adequate magnitude obtained from a generator or from synchronous motor 16, such motor being brought up to operating speed by any suitable means (not shown) and excited from a suitable direct current source 5. Under the above conditions winding 8 induces alternating current voltages in windings 9, 11, 13, 14, and energizes the control transformers through the phase shifters. Phase shifter 46, 48 is so adjusted that each anode 23 is operable when its potential is positive with respect to the potential of the cathode. Such potential relations are obtained when the associated portion of winding 11 impresses, on the anode, a negative voltage which is less in magnitude than the voltage of line 6. By the well known process of direct current inversion all anodes 23 of inverter 18 are sequentially energized to permit flow of current from line 6 through the several portions of winding 11, such current being divided into a plurality of alternating current waves in such winding. By magnetic induction, such currents are transferred to rectifier 17, the control electrodes of which are energized from control transformer 37, 42 to permit flow of current in each anode 22 from the phase of winding 13 displaced 180 electrical degrees with respect to the phase of winding 11 operating at the same instant. As is well known from the process of alternating current rectification, the process in rectifier 17 need not be controlled by the action of control electrodes 27, as each anode tends to carry current when its potential is the highest of the potentials supplied from portions of winding 13. Such operation of anodes 22 may, however, be controlled by adjustment of phase shifter 47, 49 so as to retard the operation of each anode, thereby decreasing the magnitude of the output voltage impressed on line 7 by the rectifier. The relative values of the voltages in line 6 and 7 at which the systems operate may thus be varied in any desired manner and the flow of current between the lines may be regulated.

Conversely, when it is desired to obtain flow of energy from line 7 to line 6, inverter 19 will be made operable from its control transformer 39, 44 and will supply energy to rectifier 16, which will be regulated by its control transformer 36, 41 so as to maintain the flow of energy from line 7 to line 6 at the desired intensity.

In direct current systems, it is generally desirable to maintain one of the conductors of the lines at ground potential, so that lines at different potentials need only have one of the conductors insulated from the other and from ground. In the embodiment shown in Fig. 2, lines 6 and 7 are assumed as having the negative conductors connected to ground as at 56. The separate inverters 18 and 19 of the embodiment illustrated in Fig. 1 having their cathodes severally connected with such negative conductors may then be combined in a single structure 53 provided with a single cathode connected with the common conductors of lines 6 and 7. In the modified embodiment, the energization of control electrods 28, 29 is obtained as in the embodiment of Fig. 1, batteries 33 and 34 being replaced by a single battery 54, but rectifiers 16 and 17 are not provided with control electrodes. To avoid short circuit currents in rectifier 16 and inverter 53 it therefore becomes necessary that anodes 23 be made operable only when receiving the highest negative potential from winding 11, at which times the only anode 21 in operative condition receives the highest potential from winding 9. Similar conditions prevail with respect to anodes 22 and 24 of rectifier 17 and inverter 53, respectively. Control transformers 38, 43 and 39, 44 must first be adjusted so as to obtain the result mentioned above and are then directly connected with line 10 without the interposition of phase shifters as in Fig. 1. The flow of energy from line 6 to line 7 will then take place when the voltage in line 6 exceeds the maximum voltage of winding 11 and the maximum voltage in winding 13 exceeds the voltage in line 7, the transmission of energy then occurring as described above. To permit continuation of the flow of energy independently of the relative voltage conditions in lines 6 and 7, windings 9 and 11 are provided with taps so that, if the voltage of line 6 is below the maximum voltage of winding 11, anodes 23 may be connected with taps at a lower voltage and permit the flow of energy from line 6 to line 7.

Figure 2:
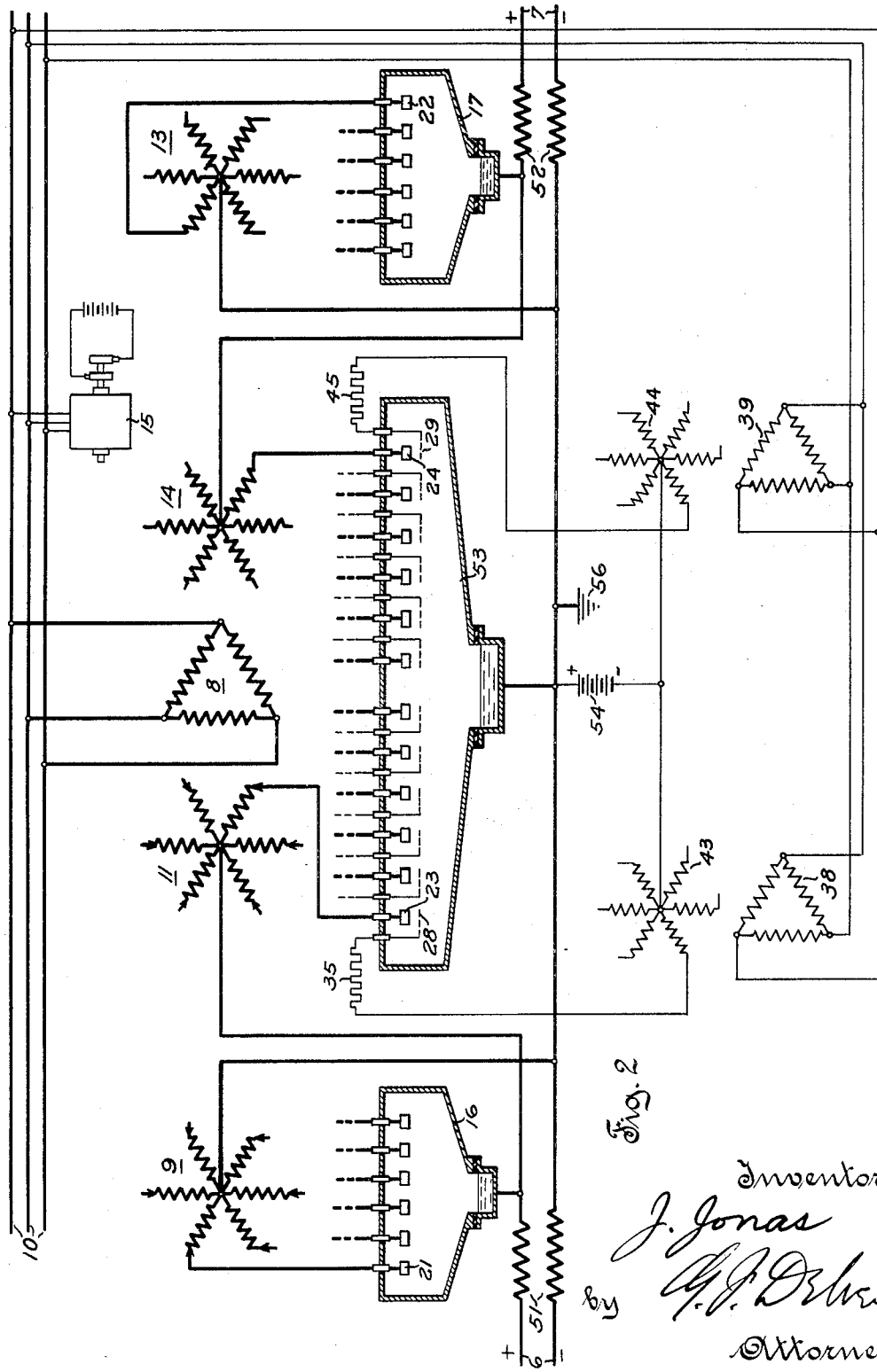
Fig. 2 illustrates an embodiment of the invention which differs from that of Fig. 1 in the combination of the two inverters of Fig. 1 in a single structure.
Figure 3:
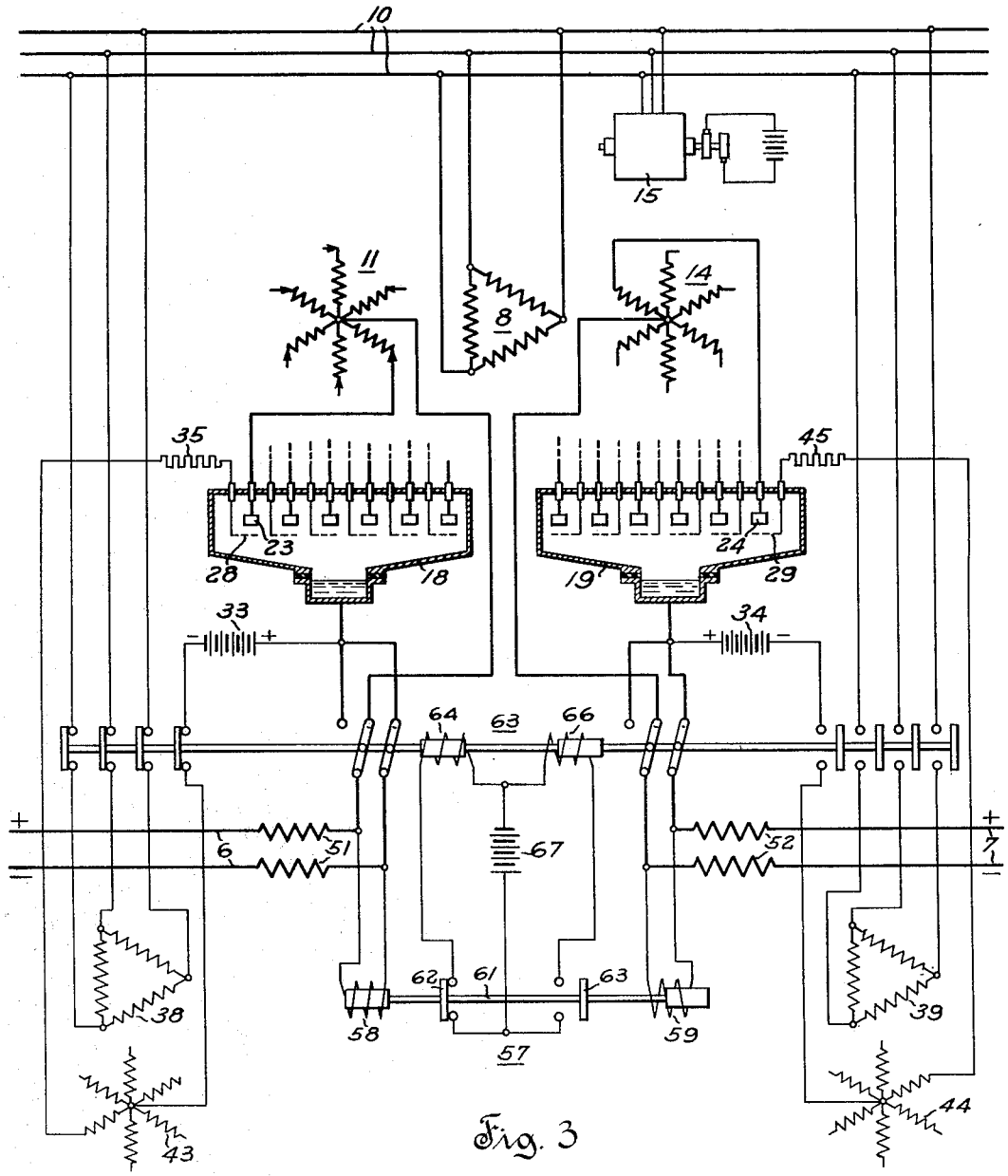
Fig. 3 illustrates a modified embodiment of the invention which differs from the embodiment shown in Fig. 1 in the use of a single converting system in which the reversal of the flow of energy is automatically produced by control means.

In the embodiment illustrated in Fig. 1, winding 9 and rectifier 16 are utilized only at such times when winding 11 and inverter 18 are not in operation and vice versa. Similarly, windings 13 and 14 with their associated rectifier 17 and inverter 19 are not simultaneously employed. As shown in Fig. 3, by providing a dual control of windings 11 and 14 and of inverters 18 and 19, it is possible to make each inverter operate as a rectifier when the associated line is to receive energy. As in the embodiment of Fig. 1, control electrodes 28 are energized from battery 33 and transformer 38, 43. Similarly, control electrodes 29 are energized from battery 34 and transformer 39, 44. Because each electron discharge device must be connected with the negative conductor of the associated supply line when operating as an inverter and must be connected with the positive conductor of such line when operating as a rectifier, to reverse the flow of energy, it is necessary not only to modify the control of the anodes of both discharge devices, but it is also necessary to reverse the connection of the cathodes of the discharge devices and of the neutral points of the associated transformer windings. In Fig. 3, all the above switching operations are shown as being obtained by means of a double pole double throw circuit breaker 63 having operating coils 64 and 66 connected to be energized from battery 67, and providing connection of the control electrodes of each discharge device with their associated sources of potential only when the cathode of the device is connected with the negative conductor of the associated line, thereby causing inversion of the current received from the line. The other discharge device, having its control electrodes disconnected from the associated energizing means can only operate as a rectifier and then has its cathode connected to the positive conductor of the associated line. Because the portion of the system operating as a rectifier does not permit energization of the control electrodes thereof, the control transformer of the corresponding structure operating as an inverter may not be provided with phase shifting means as the flow of alternating current is simultaneous in corresponding portions of windings 11 and 14 and in their respective anodes 23 and 24. The direction of the flow of energy is, therefore, determined by the position of circuit breaker 63, which can be operated manually or in response to any desired electrical or mechanical values, dependent on the relative magnitudes of the voltages in lines 6 and 7. The effect of the magnitudes of such voltages may, however, be modified as shown by providing windings 11 with taps as in the embodiment of Fig. 2. In the embodiment shown in Fig. 3, operation of circuit breaker 63 is illustrated as being dependent upon the action of a relay which is generally designated at 57 and is responsive to the relative voltage conditions in lines 6 and 7. To obtain such relative action relay 57 is provided with a coil 58 energized from line 6 and a coil 59 energized from line 7, such coils tending to move an armature 61 in opposite directions to close contacts 62 or contact 63. Coils 58 and 59 are so dimentioned as to impart equal attractions to armature 61 when the voltages in lines 6 and 7 are at their rated operating values even though such voltages may be of different magnitudes. Assuming that the voltage in line 6 is above its operating value, armature 61 will take the position shown and will close contact 62, thereby energizing coil 64 and causing movement of circuit breaker 63 into the position shown. The system is then capable of transmitting energy from line 6 to line 7, and such transfer will occur as the voltage of line 6 is assumed to be above its rated value and the voltage in line 7 below its rated value. It will be apparent to those skilled in the art that circuit breaker 63 may also connect the control transformer, associated with the discharge device used as a rectifier at the instant considered, with the control electrodes thereof so as to permit operation of the device as a rectifier, the purpose of such connnection being to obtain a more stable operation of the device.

It will be understood that, in all three embodiments illustrated, current consuming devices may be connected with line 10 to receive inverted current from either line 6 or line 7 and, conversely, that a generator may be connected with line 10 to supply current to either line 6 or line 7. Such conversion may take place simultaneously with the conversion of current between lines 6 and 7 or may take place independently thereof.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a system for converting direct current voltages, a plurality of direct current lines at different voltages, a plurality of electron discharge devices having anodes with associated control electrodes and a cathode, an alternating current line, a transformer having a primary winding connected with said alternating current line and a plurality of star neutral point connected secondary windings coupled to said primary winding, the conductors of said direct current lines being connected with the said neutral points of the said secondary windings and the cathodes of said devices, and electric current translating means connected with and energized from said alternating current line to control the energization of the control electrodes of said devices.

2. In a system for converting direct current voltages, a direct current line at one voltage, an electron discharge device having anodes with associated control electrodes and a cathode, a second direct current line at another voltage, a second electron discharge device having anodes with associated control electrodes and a cathode, an alternating current line, a transformer having a primary winding connected with said alternating current line and a plurality of star neutral point connected secondary windings connected with the anodes of said devices, the cathode of each of said devices being connected with one conductor of said direct current lines, the said neutral point of the secondary winding connected with the anodes of one of said devices being connected with the cathode of another of said devices, and transformer means connected with said alternating current line and with the control electrodes of said devices to control the operation of the anodes thereof.

3. In a system for converting direct current voltages, a direct current line at one voltage, an electron discharge device having anodes with associated control electrodes and a cathode, a second direct current line at another voltage, a second electron discharge device having anodes with associated control electrodes and a cathode, an alternating current line, a transformer having a primary winding connected with said alternating current line and a plurality of star neutral point connected secondary windings connected with the anodes of said devices, the cathode of each of said devices being connected with one conductor of said direct current lines, the said neutral point of the secondary winding connected with the anodes of one of said devices being connected with cathode of another of said devices, and electric current translating means connected with said alternating current line and the control electrodes of said devices operable to sequentially impress potential on the latter at such recurring periods and of such sign and magnitude as to control the operation of the anodes thereof.

4. In a system for converting direct current voltages, a plurality of direct current lines at different voltages, an electron discharge device operating as an electric current inverter connected with one of said lines, an electron discharge device operating as an electric current rectifier connected with another of said lines, a source of alternating current potential, a transformer having a plurality of windings inductively interconnecting said devices and said source of alternating current potential, and electric current translating means connected with said source of alternating current potential for controlling the operation of one of said devices in dependence upon the frequency of said source of alternating potential.

5. In a system for converting direct current voltages, a plurality of direct current lines at different voltages, an electron discharge device operating as an electric current inverter connected with one of said lines, an electron discharge device operating as an electric current rectifier connected with another of said lines, a source of alternating current potential, a transformer having a plurality of windings inductively interconnecting said devices and said source of alternating current potential, and transformers connected with said source of alternating potential to control the operation of one of said devices in response to the frequency of said source of alternating potential.

6. In a system for converting direct current voltages, a plurality of direct current lines at different voltages, an electron discharge device operating as an electric current inverter connected with one of said lines, said device having anodes with control electrodes, an electron discharge device operating as an electric current rectifier connected with another of said lines, a source of alternating current potential, a transformer having a plurality of windings inductively interconnecting said devices and said source of alternating current potential, and transformers connected with said source of alternating current potential and with the control electrodes to control the flow of energy between said lines by control of the potential of such flow.

7. In a system for converting direct current voltages, a plurality of direct current lines at different voltages, an electron discharge device operating as an electric current inverter connected with one of said lines, said device having anodes with associated control electrodes, an electron discharge device operating as an electric current rectifier connected with another of said lines, a source of alternating current potential, a transformer having a plurality of windings inductively interconnecting said devices and said source of alternating current potential, transformers connected with the control electrodes, and means connected with said source of alternating potential and with the last said transformers to vary the phases of the potentials impressed on the control electrodes relative to the phases of the potentials of said alternating current source.

8. In a system for converting direct current voltages, a plurality of direct current lines at different voltages, electron discharge devices having anodes with associated control electrodes connected with each of said lines, said devices being operable to invert and to rectify electric current, a source of alternating current potential, a transformer inductively interconnecting said devices and said source of alternating current potential, transformers connecting the control electrodes with said source of alternating current potential, and electromagnetically actuated means operable in response to the conditions of said lines to reverse the direction of energy flow between said lines.

9. In a system for converting direct current voltages, a plurality of direct current lines at different voltages, electron discharge devices having anodes with associated control electrodes connected with each of said lines, said devices being operable to invert and to rectify electric current respectively, a source of alternating current potential, a transformer inductively interconnecting said devices and said source of alternating current potential, transformers connecting the control electrodes with said source of alternating current potential, a circuit breaker controlling the connection of said devices with said lines, and a relay energized in response to the voltage conditions of said lines to control operation of said circuit breaker automatically to cause flow of energy from said line at higher potential to said line at lower potential.

10. In combination, a plurality of direct current circuits, and means for converting current supplied from one of said circuits into current at a different voltage and the supply thereof to another of said circuits, comprising electron discharge means having a plurality of groups of anodes forming paths for flow of said current, each said paths including an anode of each said group thereof, and means for controlling the sequential initiation and duration of said flow of current by way of said paths, said latter means comprising a plurality of control electrodes severally associated with said anodes, a source of alternating current, means interconnecting said source of alternating current with said control electrodes operable to impress potential on the latter at such recurring periods and of such sign and magnitude as to permit initiation of said flow of current sequentially through said several paths, and means interconnecting said source of alternating current with said anodes operable to impress potential thereon at such recurring periods and of such sign and magnitude as to control the duration of said flow of current sequentially through the respective said paths.

11. In combination, a plurality of direct current circuits, and means for converting current supplied from one of said circuits into current at another voltage and the supply thereof to another of said circuits, comprising electron discharge means having a plurality of groups of anodes forming paths for flow of said current, each said path including an anode of each said group thereof, and means for controlling the sequential initiation and duration of said flow of current by way of said paths, said latter means comprising a plurality of control electrodes severally associated with said anodes, a source of current connected with and operable to continuously impress potential on each of said control electrodes of such sign and magnitude as to prevent initiation of said flow of current by way of said paths, a source of alternating current, means interconnecting said source of alternating current with said control electrodes operable to impress potential on the latter at such recurring periods and of such sign and magnitude to permit initiation of said flow of current sequentially through said several paths, and means interconnecting said source of alternating current with said anodes operable to impress potential thereon at such recurring periods and of such sign and magnitude as to control the duration of said flow of current sequentially through the respective said paths.

12. In combination, a plurality of direct current circuits, and means for converting current supplied from one of said circuits into current of predetermined voltage relative to the voltage of said one of said circuits and the supply thereof to another of said circuits, comprising electron discharge means having a plurality of groups of anodes forming paths for flow of said current, each said path including an anode of each said group thereof, and means for controlling the sequential initiation and duration of said flow of current by way of said paths, said latter means comprising a plurality of control electrodes severally associated with said anodes, a source of alternating current, transformer means having winding sections connected with said source of alternating current and severally connected with said control electrodes operable to impress potential on the latter at such recurring periods and of such sign and magnitude as to permit initiation of said flow of current sequentially through said several paths, and means interconnecting said source of alternating current with said anodes operable to impress potential thereon at such recurring periods and of such sign and magnitude as to control the duration of said flow of current sequentially through said paths.

13. In combination, a plurality of direct current circuits, and means for converting current supplied from one of said circuits into current of predetermined voltage relative to the voltage of said one of said circuits and the supply thereof to another of said circuits, comprising electron discharge means having a plurality of groups of anodes forming paths for the flow of said current, each said path including an anode of each said group thereof, and means for controlling the sequential initiation and duration of said flow of current by way of said paths, said latter means comprising a plurality of control electrodes severally associated with said anodes, a source of alternating current, transformer means interlinking said source of alternating current with said control electrodes including a plurality of winding sections severally connected with the latter operable to impress potential on said control electrodes at such recurring periods and of such sign and magnitude as to permit initiation of said flow of current sequentially through said several paths, and transformer means interlinking said circuits having winding sections severally connected with said anodes operable to impress on the latter potential at such recurring periods and of such sign and magnitude as to control the duration of said flow of current sequentially through said paths.

14. In combination, a plurality of direct current circuits, and means for converting current supplied from one of said circuits into current of predetermined voltage relative to the voltage of said one of said circuits and the supply thereof to another of said circuits, comprising electron discharge means having a plurality of groups of anodes forming paths for the flow of said current, each said path including an anode of each said group thereof, and means for controlling the sequential inititation and duration of said flow of current by way of said paths, the said latter means comprising a plurality of control electrodes severally associated with said anodes, a source of alternating current connected with said control electrodes operable to impress potential on the latter at such recurring periods and of such sign and magnitude as to permit initiation of said flow of current sequentially through said paths, means interconnecting said source of alternating current with said anodes operable to impress potential thereon at such recurring periods and of such sign and magitude as to control the duration of said flow of current sequentially through the respective said paths, and means connected intermediate said source of alternating current circuit and said control electrodes operable to vary the moments of said impression of potential on the respective said control electrodes relative to the moments of impression of said potential on the associated ones of said anodes.

JULIUS JONAS.